April 25, 1961     J. P. PETERSON     2,980,915
FISHING GLOVE
Filed Aug. 3, 1959

INVENTOR.
JULIUS P. PETERSON
BY
ATTORNEY

United States Patent Office 2,980,915
Patented Apr. 25, 1961

2,980,915

FISHING GLOVE

Julius P. Peterson, 544 Raleigh St., Denver, Colo.

Filed Aug. 3, 1959, Ser. No. 831,263

10 Claims. (Cl. 2—159)

This invention relates to gloves, and more particularly, to fishing gloves.

The accepted manner of landing a fish is with a landing net to prevent the fish from getting away during the critical period when it is being taken from the water. Even with a net, however, many a fish has been lost when the fisherman attempts to untangle and remove the fish from the net. The slime on the body of the fish renders it extremely difficult to hold on to especially when they are wriggling vigorously in an attempt to escape.

Many fishermen, however, dislike carrying a landing net because they are continually getting snagged on bushes and the like. This occurrence becomes so frequent and annoying, especially in dense country, that the fisherman would rather leave the net at home and risk losing a fish than carry the net.

Landing nets are also difficult to use by anyone but a skilled fisherman and can result in losing a fish that might otherwise have been caught. Frequently the presence of the net in close proximity to the fish will scare it into such frenzied activity that it will escape.

The principal object of the present invention, therefore, is to provide a novel fishing glove which can be worn at all times by the fisherman to assist in securely grasping the body of a fish when taking it from the water.

A second object of the invention is to provide a fishing glove that permits complete freedom of hand movement for casting, baiting the hook, changing flies and other necessary tasks performed by the fisherman.

A third object of the invention is to provide a fishing glove that may be used in place of a landing net thus eliminating the annoying problems attendant to carrying and using a net.

Another object of the invention is to provide a fishing glove constructed for easy cleaning to remove fish scales and slime that may clog the mesh that forms the fish-gripping elements of the glove.

Further objects of the invention are to provide a fishing glove that is simple and inexpensive to manufacture, comfortable to wear, lightweight and compact.

Other objects will be in part apparent and in part pointed out specifically hereinafter in connection with the description of the drawing that follows in which.

Figure 1:
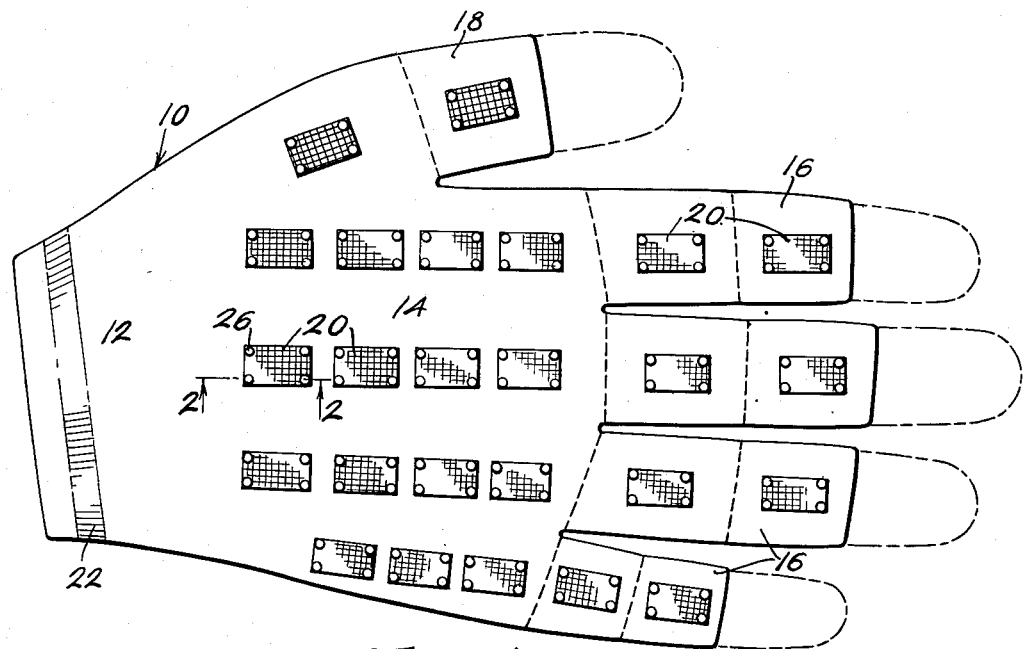
Figure 1 is a top plan view of the fishing glove of the present invention.

Referring now to Figure 1 of the drawing, the fishing glove of the present invention, indicated in a general way by numeral 10, will be seen to comprise a glove 12 having the palm 14, fingers 16 and thumb 18 thereof provided with a plurality of mesh assemblies 20. In the preferred construction illustrated in Figure 1, the glove 12 is designed with the tips of the fingers 16 and thumb 18 removed to give the fisherman greater freedom of movement and dexterity in performing the many intricate tasks necessary while fishing such as, tying on flies, stringing line, tying leaders, baiting hooks, etc. Although the glove 12 may be formed from any one of a number of conventional glove-forming materials that are both durable and pliable, a preferred material would be one that is also water-resistant in the sense that it will not deteriorate in water although it may become wet, such as nylon, Orlon or other pliable plastic material, silk or chamois. Although ordinary leather will work satisfactorily, it has a tendency to become stiff and hard after it dries out if it has been immersed in water. Also, the glove is preferably designed to fit tightly around the wrist and may be provided with an elastic band 22 or other equivalent means for securely fastening the glove to the hand. The glove can, of course, be made in either right or left-hand models, only a left-hand glove having been illustrated. The glove will usually be worn on the left hand of a right-handed fisherman and vice versa for a left-handed fisherman, assuming that the right-handed fisherman holds his fishing rod in his right hand, as a fish is customarily landed while the rod is still being held. Although only one glove need be used, they may be used on both hands if desired as the rod-gripping hand oftentimes requires an aid for gripping the handle of the rod, especially if it is wet.

The mesh assemblies 20, 20a and 20b, specifically illustrated in Figures 2 through 6, inclusive, may be used interchangeably on the glove 12 to provide a secure gripping surface to engage and hold the body of a fish being taken from the water. Again in connection with Figure 1, it will be noted that each of the mesh assemblies is quite small and sized to fit between the joints in the fingers and thumb of the hand; and also into the palm of the hand in a manner to not interfere with normal folding thereof. All of the mesh assemblies are, of course, attached to the palm-side of the glove where they will come into direct contact with the body of the fish as it is being lifted from the water.

Figure 2:
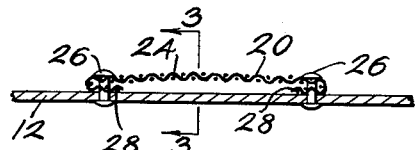
Figure 2 is an enlarged fragmentary section taken along line 2—2 of Figure 1.
Figure 3:
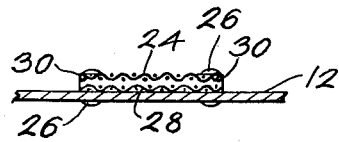
Figure 3 is a section taken along line 3—3 of Figure 2.

Now, in connection with Figures 2 and 3, the simplest and least expensive of the three forms of mesh assemblies will be described. Mesh assembly 20 consists merely of a small piece of wire, plastic or fibre mesh 24 folded under at opposite ends and riveted or otherwise attached to the glove 12 by fasteners 26 passing through the folds 28 and the material of the glove. The sides 30 of the mesh assemblies are left open in the preferred construction illustrated to permit the mesh to be cleansed of fish scales and slime by merely swishing the glove back and forth from side to side under water. Also, the mesh 24 is preferably spaced slightly from the glove in the central portion to provide a better gripping surface and enable it to be cleaned more easily. Actually, this spacing of the mesh relative to the glove can be quite small amounting to no more than the single thickness of folds 28 in the Figures 2 and 3 construction as this mesh will have a tendency to hump up in the middle as the fingers are clenched about the body of the fish thus achieving the desired spacing.

Figure 4:
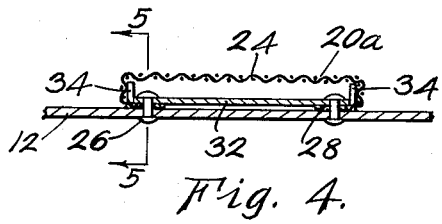
Figure 4 is a section similar to Figure 2 showing a slightly modified form of mesh assembly.
Figure 5:
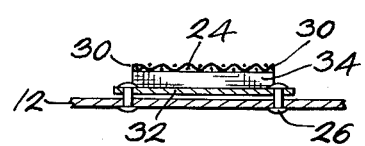
Figure 5 is a section taken along line 5—5 of Figure 4.

The modified mesh assembly 20a of Figures 4 and 5 includes in addition to the mesh 24 and fasteners 26, a metal plate 32 having upturned ends 34. The folded ends of the mesh are wrapped around the upturned ends of the plate which maintains the mesh in fixed spaced relation to the plate and glove. The fasteners are attached through the plate, folds in the mesh and the material of the glove, as shown. In this construction the mesh, of course, cannot hump when the fingers are clenched due to the presence of the plate and, therefore, the upturned ends of the plate are used to maintain the spaced relation between the mesh, plate and glove. Also, as will be seen in Figure 5, the mesh is somewhat narrower than the plate in order to facilitate fastening the mesh assembly to the glove.

Figure 6:
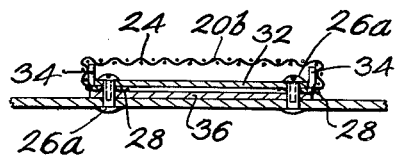
Figure 6 is a section similar to Figures 2 and 4 showing a further modified form of mesh assembly.

In Figure 6, a further modified mesh assembly 20b is shown. This mesh assembly is in the form of a detachable unit removably fastened to the glove with the fasteners 26a of a type that can be taken out or apart to permit replacement of the mesh assemblies. Mesh assembly 20b is much like 20a except that a second plate 36 is positioned between the plate 32 and the surface of the glove. The folds 28 on the ends of the mesh are clamped between plates 32 and 36 to form an independent unit that can be detachably fastened to any ordinary glove in any desired position by merely providing openings therein located to receive the fasteners 26a.

From the foregoing description of the many useful and novel features of the fishing glove of the present invention it will be seen that the several useful objects for which it was designed have been achieved. Although the invention has been described in connection with the three specific forms thereof illustrated in the accompanying drawing, I realize that certain changes and modifications may be made therein by those skilled in the art; therefore, it is my intention that the scope of protection afforded hereby shall be limited only insofar as said limitations are expressly set forth in the appended claims which follow.

What is claimed is:

1. In a glove of the type having a palm, fingers and a thumb, the improvement which comprises a plurality of small individual mesh elements attached to the palm, thumb and fingers on those portions thereof lying only between the joints of the hand, said mesh elements being adapted to provide a secure grip to a slipping surface when the hand and glove are clenched thereabout.

2. A device in accordance with claim 1 in which the mesh elements are detachably fastened to the glove to permit interchange and replacement thereof.

3. A device in accordance with claim 1 in which the mesh elements are attached to the glove along opposite ends, the sides being open to permit said mesh elements to be cleaned.

4. A device in accordance with claim 1 in which the mesh elements are mounted with the portion between the ends thereof in spaced relation to the glove to provide a better gripping surface in engagement with the article being grasped.

5. A device in accordance with claim 1 in which a plate is positioned between each mesh element and the adjacent surface of the glove, the mesh elements being folded over the ends of the plate, and said plate preventing humping of the mesh elements when the glove and hand are clenched.

6. A device in accordance with claim 5 in which the plate is formed with upturned ends to maintain the mesh element in spaced relation to said plate and glove.

7. A device in accordance with claim 6 in which a second plate is positioned between the first-mentioned plate and glove, the mesh element having the ends thereof folded, and the folded portions positioned between the plates.

8. An article of manufacture comprising: a substantially rectangular plate having upturned ends; a second flat plate positioned underneath the first-mentioned plate; a mesh element having the ends thereof folded around the upturned ends of the first-mentioned plate and the folded portions positioned between said plates; and, fastening means attaching the plates together with the folded portions of the mesh elements gripped therebetween.

9. A device for grasping fish and the like comprising: a glove having a palm, fingers and a thumb, the ends of the fingers and thumb being open; and, a plurality of small individual mesh elements attached to the palm, fingers and thumb of the glove in position to lie between the joints of the hand, the opposite ends of each mesh element being attached to the glove with the sides of said mesh element unattached to prevent debris from collecting between said mesh elements and glove.

10. A device in accordance with claim 9 in which the ends of the mesh elements are folded under, the folded ends lying against the glove and maintaining the remaining portion of said mesh element in spaced relation to said glove.

References Cited in the file of this patent

UNITED STATES PATENTS

| 1,250,150 | DuBois | Dec. 18, 1917 |
| 2,074,390 | Green | Mar. 23, 1937 |

FOREIGN PATENTS

| 16,945 | Great Britain | July 31, 1902 |